United States Patent
Allen, Jr. et al.

(10) Patent No.: US 8,418,077 B2
(45) Date of Patent: Apr. 9, 2013

(54) FILE CONTENT NAVIGATION USING BINARY SEARCH

(75) Inventors: Lloyd W. Allen, Jr., Cary, NC (US);
Travis M. Grigsby, Austin, TX (US);
Jana H. Jenkins, Raleigh, NC (US);
Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 12/542,876

(22) Filed: Aug. 18, 2009

(65) Prior Publication Data

US 2011/0047503 A1 Feb. 24, 2011

(51) Int. Cl.
*G06F 3/048* (2006.01)
(52) U.S. Cl. .................................................... 715/784
(58) Field of Classification Search .................... 715/784
See application file for complete search history.

(56) References Cited

U.S. PATENT DOCUMENTS

| | | | | |
|---|---|---|---|---|
| 5,371,846 | A * | 12/1994 | Bates | 715/786 |
| 5,572,647 | A * | 11/1996 | Blades | 715/798 |
| 5,874,961 | A | 2/1999 | Bates et al. | |
| 6,204,846 | B1 * | 3/2001 | Little et al. | 715/784 |
| 2006/0038796 | A1 * | 2/2006 | Hinckley et al. | 345/173 |
| 2006/0190479 | A1 * | 8/2006 | Reiner | 707/103 R |
| 2009/0012952 | A1 * | 1/2009 | Fredriksson | 707/5 |
| 2010/0058238 | A1 * | 3/2010 | Ben Moshe | 715/818 |

* cited by examiner

*Primary Examiner* — William Bashore
*Assistant Examiner* — Hien Duong
(74) *Attorney, Agent, or Firm* — DeLizio Gilliam, PLLC

(57) ABSTRACT

Scrolling through a large file using a small scroll handle can be challenging for users. Using the small scroll handle to navigate through the large file rarely produces accurate results. Functionality can be implemented to navigate through file content without the user having to locate, click on, and drag the scroll handle. Content navigation can be achieved by employing knowledge of a current focus in the file and performing scroll jumps in accordance with binary search techniques. Navigation scope for the file can be refined at each iteration, based on a user indicating whether to move up or down in the file after each intermediate position. Such a technique for content navigation can help users locate content in a file with greater speed and accuracy.

20 Claims, 4 Drawing Sheets

FILE CONTENT NAVIGATION USING BINARY SEARCH

BACKGROUND

Embodiments of the inventive subject matter generally relate to the field of navigation through file content, and more particularly, to techniques for navigating through file content in accordance with a binary search mechanism.

The size of a scroll bar handle in a large file is typically very small, making it difficult to control the position of the scroll bar handle. Clicking on a scroll bar or dragging the scroll bar handle does not allow for precise navigation through the file and rarely produces accurate results.

SUMMARY

Embodiments include a method comprising receiving a binary navigation input for navigating content. An application displays a current portion of the content with a user interface. It is determined whether the binary navigation input navigates between the current portion of the content and a beginning navigation portion of the content or an ending navigation portion of the content. An intermediate position is determined. The intermediate position is a midpoint between the current portion of the content and the beginning navigation portion of the content if the binary navigation input navigates between the current portion of the content and the beginning navigation portion of the content. However, if the binary content navigation input navigates between the current portion of the content and the ending navigation portion of the content, the intermediate position is a midpoint between the current portion of the content and the ending navigation portion of the content. An indication of the current portion as a new ending navigation portion is stored if the binary content navigation input navigates between the current portion of the content and the beginning navigation portion of the content while, an indication of the current portion as a new beginning navigation portion is stored if the binary content navigation input navigates between the current portion of the content and the ending navigation portion of the content. A portion of the content that corresponds to the intermediate position is displayed in response to determining the intermediate position.

Another embodiment includes a computer program product for binary content navigation, where the computer program product comprises a computer usable medium comprising computer usable program code. The computer usable program code is configured to receive a binary navigation input for navigating content and to determine whether the binary navigation input navigates between a current portion of the content and a beginning navigation portion of the content or an ending navigation portion of the content. An application displays the current portion of the content with a user interface. The computer usable program code is configured to determine an intermediate position. If the binary content navigation input navigates between the current portion of the content and the beginning navigation portion of the content, the intermediate position is a midpoint between the current portion of the content and the beginning navigation portion of the content. However, if the binary content navigation input navigates between the current portion of the content and the ending navigation portion of the content, the intermediate position is a midpoint between the current portion of the content and the ending navigation portion of the content. The computer usable program code is also configured to store an indication of the current portion as a new ending navigation portion if the binary content navigation input navigates between the current portion of the content and the beginning navigation portion of the content or store an indication of the current portion as a new beginning navigation portion if the binary content navigation input navigates between the current portion of the content and the ending navigation portion of the content. The computer usable program code is configured to display a portion of the content that corresponds to the intermediate position in response to the computer usable program code determining the intermediate position.

Another embodiment includes an apparatus comprising a processor, a network interface coupled with the processor, and a binary focus navigation unit. The binary focus navigation unit is operable to receive a binary navigation input for navigating content and to determine whether the binary navigation input navigates between a current portion of the content and a beginning navigation portion of the content or an ending navigation portion of the content. An application displays the current portion of the content with a user interface. The binary focus navigation unit is operable to determine an intermediate position. The intermediate position is midpoint between the current portion of the content and the beginning navigation portion of the content if the binary navigation input navigates between the current portion of the content and the beginning navigation portion of the content. The intermediate position is a midpoint between the current portion of the content and the ending navigation portion of the content if the binary content navigation input navigates between the current portion of the content and the ending navigation portion of the content. The binary focus navigation unit is operable to store an indication of the current portion as a new ending navigation portion if the binary content navigation input navigates between the current portion of the content and the beginning navigation portion of the content and store an indication of the current portion as a new beginning navigation portion if the binary content navigation input navigates between the current portion of the content and the ending navigation portion of the content. The binary focus navigation unit is also operable to display a portion of the content that corresponds to the intermediate position in response to the binary focus navigation unit determining the intermediate position.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to techniques for navigating through content in text files, embodiments can also implement binary content navigation for scrolling through content in various other types of files such as audio files, video files, spreadsheets, etc. In other instances, well-known instruction instances, protocols, structures, and techniques have not been shown in detail in order not to obfuscate the description.

Users generally have trouble scrolling through content presented by an application on a computer (e.g., surfing the Internet, navigating through files, etc). It may be troublesome for users to look for a small scroll handle, click on the scroll handle, and drag the scroll handle through a large document in order to locate content in the document.

A scrolling mechanism that does not require the user to navigate through a file using a small scroll handle can help users navigate through the file to locate content with better accuracy. The scrolling mechanism can employ knowledge of a current focus in the file and perform scroll jumps using a binary search technique. The scrolling mechanism can narrow the binary search navigation scope at each iteration, based on a user indicating whether to move up or down in the file after each intermediate position. Such a scrolling mechanism can especially help users trying to locate content in a file with which they are familiar or that has an intuitive logical organization. The scrolling mechanism based on binary search techniques can improve the speed and efficiency of scrolling through large files.

Figure 1:
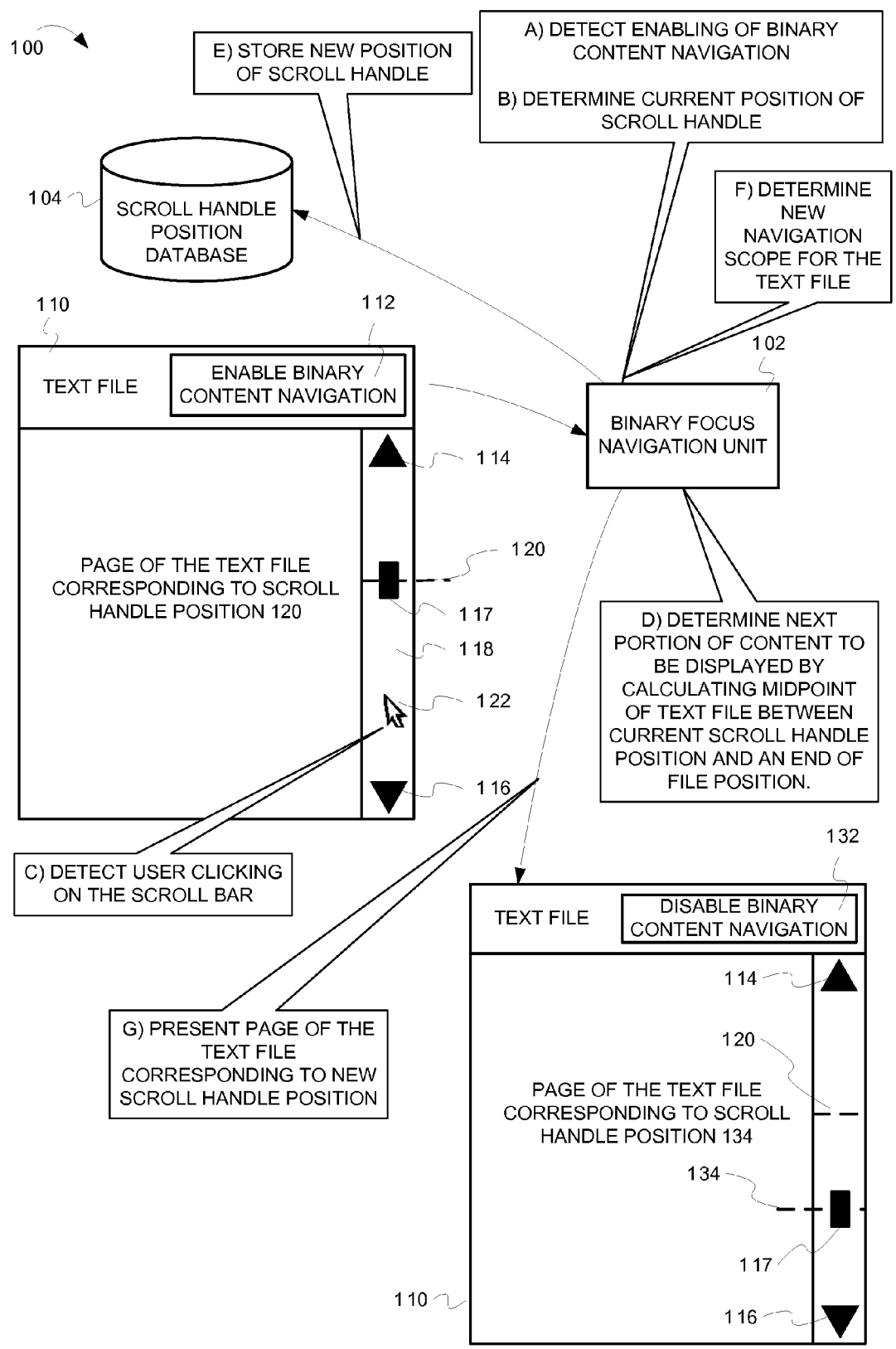
FIG. 1 is a conceptual diagram illustrating file content navigation based on a binary search algorithm.

FIG. 1 is a conceptual diagram illustrating file content navigation based on binary search techniques. FIG. 1 depicts a binary focus navigation unit 102 coupled with a scroll handle position database 104.

A user can launch a text file 110 by clicking on an icon associated with the text file 110, typing an address of the text file 110, clicking on a link that leads to the text file 110, etc. After the user launches the text file 110, the binary focus navigation unit 102 triggers a presentation of a first page of the text file on a display unit (e.g., a monitor on a computer). In one implementation, the binary focus navigation unit 102 may present a page of the text file 110 that corresponds to the midpoint of the text file. In another implementation, the binary focus navigation unit 102 can present a last viewed page of the text file 110. In some implementations, an operating system on the user's machine may present an appropriate page of the text file 110 in accordance with user preferences.

At stage A, the binary focus navigation unit 102 detects that file content navigation using a binary search technique ("binary content navigation") has been enabled in the text file 110. In some implementations, the binary focus navigation unit 102 may be configured such that binary content navigation is automatically enabled in the text file 110, when the user launches the text file 110. In other implementations, the user may be required to manually enable binary content navigation after the user launches the text file 110. For example, the binary focus navigation unit 102 can detect that binary content navigation has been enabled in the text file 110 in response to the user clicking on an "enable binary content navigation" button 112. The binary focus navigation unit 102 also presents, on the text file 110, a scroll bar 118 comprising a scroll handle 117 for navigating through content in the text file 110, an upper extremity 114 indicating a start of the text file, and a lower extremity 116 indicating an end of the text file. The user can operate the scroll handle 117 (e.g., by dragging the scroll handle to a desired position within the scroll bar 118, using one or more keys on a keyboard, clicking on one of the scroll bar extremities, etc.) to navigate through the text file 110. The user may enable or disable binary search-style scrolling at any point in time. For example, the user can enable binary content navigation, starting from a first page in the text file 110, as soon as the text file 110 is launched. As another example, the user can manually drag the scroll handle 117 to a position in the text file 110 (e.g., scroll handle position 120) and enable binary content navigation from the scroll handle position 120.

At stage B, the binary focus navigation unit 102 determines a current position of the scroll handle 117. As depicted in FIG. 1, the binary focus navigation unit 102 detects that the scroll handle 117 is at position 120 within the scroll bar 118. The binary focus navigation unit 102 can determine the current position of the scroll handle 117 based on a distance of the scroll handle 117 from the scroll bar's upper extremity 114 and/or lower extremity. The binary focus navigation unit 102 can determine a page number associated with the current position 120 of the scroll handle 117. The binary focus navigation unit 102 can also determine a page number associated with content of the page currently being displayed (i.e., the current focus in the text file 110).

At stage C, the binary focus navigation unit 102 detects a user clicking on the scroll bar. The binary focus navigation unit 102 determines that the user clicked on position 122 ("clicked position") on the scroll bar. The binary focus navigation unit 102 can identify the clicked position 122 as a distance from the scroll bar's upper extremity 114 and/or lower extremity 116. The binary focus navigation unit 102 can compare the clicked position 122 with the current position 120 of the scroll handle. At stage C, the binary focus navigation unit 102 determines that the clicked position 122 is below the current position 120 of the scroll handle 117.

At stage D, the binary focus navigation unit 102 determines a next portion of content to be displayed. On determining that the clicked position 122 is below the current position 120 of the scroll handle 117, the binary focus navigation unit 102 calculates a midpoint of the text file 110 between the current position of the scroll handle 117 and the end of file position 116. In some implementations, the binary focus navigation unit 102 can determine a midpoint between a currently presented portion of the content of the text file 110 and content corresponding to the end of file position 116. Embodiments are not limited to determining a true midpoint. For instance, the binary focus navigation unit 102 may determine an intermediate position approximately halfway (e.g., midpoint plus an offset) between the currently presented portion of the content of the text file 110 and content corresponding to the end of file position 116. The binary focus navigation unit 102 may use an approximate midpoint instead of a true midpoint for better calculation, efficiency, and presentation of the content. For example, adjusting the calculated midpoint slightly from the true midpoint may produce a more desirable navigation result. The binary focus navigation unit 102 may also calculate a page number corresponding to the midpoint of the text file 110 between the current position of the scroll handle 117 and the end of file position 116. For example, if the current position 120 corresponds to page 50 and the last page of the text file 110 corresponds to page 150, the binary focus navigation unit 102 can determine that page 100 is the required midpoint and hence corresponds to the next page to be displayed.

At stage E, the binary focus navigation unit 102 stores the new position of the scroll handle 117. The binary focus navigation unit 102 modifies the current position 134 of the scroll handle 117 to the midpoint calculated at stage D. The binary focus navigation unit 102 stores the current position 134 of the scroll handle 117 in the scroll handle position database 104. The binary focus navigation unit 102 may discard or overwrite the previous position 120 of the scroll handle. In some implementations, the binary focus navigation unit 102 stores a history of positions of the scroll handle. This can enable the user to go back to a previous page or previous scroll handle position.

At stage F, the binary focus navigation unit 102 calculates a new navigation scope for the text file 110. The navigation scope can indicate a segment of the text file through which the user is permitted to navigate. Binary content navigation iteratively reduces the current navigation scope for the text file 110 by half each time the user clicks above or below the scroll handle 117. In reducing the navigation scope, the binary focus navigation unit 102 allows the user to navigate through only a limited section of the text file 110. The section of the text file 110 through which the user may navigate is dependent on whether the user clicks above or below the current position of the scroll handle (determined at stage C). Reducing the navigation scope of the document in response to the user's input improves the likelihood of quickly locating content in the text file 110. Before presenting the content of the text file 110 corresponding to the current position 134 of the scroll handle, the binary focus navigation unit 102 also determines a new navigation scope for the text file 110. In the example of FIG. 1, because the user clicks below the position 120, the new navigation scope for the text file 110 is the lower half of the text file (i.e., the content between the position 120 and the end of file position). The binary focus navigation unit 102 can also store the previous position of the scroll handle as a beginning navigation position of the text file content. The binary focus navigation unit 102 can store the end of file position as an ending navigation portion of the text file content.

The binary focus navigation unit 102 can also present a new scroll bar to indicate the new navigation scope and to facilitate better navigation through the new navigation scope. In another implementation, the binary focus navigation unit 102 may not present a new scroll bar but may magnify a portion of the existing scroll bar 118 corresponding to the new navigation scope of the text file 110. In another implementation, the binary focus navigation unit 102 may modify or adjust the scroll bar 118 to reflect a change in navigation scope. For example, the binary focus navigation unit 102 can resize the scroll bar, place the scroll handle at the midpoint of the resized scroll bar, where the start of the resized scroll bar indicates the previous position 120 of the scroll handle. The end of the resized scroll bar can indicate the end of text file position 116, and the current position of the scroll handle can indicate the midpoint (determined at stage E) of the current navigation scope of the text file. Thus, the resized scroll bar may be used to navigate solely through the new navigation scope of the text file 110.

At stage G, the binary focus navigation unit 102 presents content of the text file 110 corresponding to the midpoint position 134 of the scroll handle (calculated at stage D). The position 134 is the midpoint between position 120 and end of file position 116. The binary focus navigation unit 102 also presents a "disable binary content navigation" button 132, on which the user can click to disable binary content navigation. The user can click on the button 132 to disable binary content navigation once the user reaches a desired page within the text file 110. The user can also disable binary content navigation if the user is sufficiently close to or in a general area of the desired page within the text file 110 and wishes to examine the text file 110 on a page-by-page basis.

It should be noted that the operations described in FIG. 1 are examples and should be not used to limit the scope of the embodiments. For example, in some implementations, if the binary focus navigation unit 102 determines that the user has clicked on the current position of the scroll handle or on the scroll handle 117, the binary focus navigation unit 102 can determine whether the clicked position is closer to the upper extremity 114 or the lower extremity 116 of the scroll bar 118. The binary focus navigation unit 102 can calculate a midpoint of the text file between the current position of the scroll handle and the extremity that is closest to the scroll handle 117. In another implementation, the binary focus navigation unit 102 can prompt the user to click either above or below the scroll handle. In another implementation, the binary focus navigation unit 102 may not perform any action (e.g., calculating the midpoint and the new navigation scope of the text file, presenting a content associated with the new navigation scope of the text file) until the user clicks above/below the scroll handle 117. Also, although FIG. 1 depicts the binary focus navigation unit 102 detecting a mouse click user input, any form of binary navigation input for navigating the content of the text file may be used and detected. For example, a user may use voice commands, press keys on a keyboard, click on a graphical object on the display, touch a graphical object on a touch-screen, etc. The binary focus navigation unit 102 may be configured to detect one or more forms of binary navigation input.

Also, the binary focus navigation unit 102 may interface with a user preference database (not shown) to tailor operations for binary content navigation in accordance with the user's preferences. For example, the binary focus navigation unit 102 may access the user's preferences to determine whether binary content navigation should be enabled automatically or on receiving a user input. Operations for configuring the binary focus navigation unit 102 are further described in FIG. 3.

The binary focus navigation unit 102 may also store, in the scroll handle position database 104, information about files that have been launched and for which binary content navigation has been enabled. For example, the binary focus navigation unit 102 may create a new instance of a structure for storing file information every time the user launches a new file (or other application for which binary content navigation may be enabled). The scroll handle position database 104 may be stored as part of the binary focus navigation unit 102 or as a separate entity. Along with storing information identifying the file (e.g., file name, file address, etc.), the binary focus navigation unit 102 may also store a current position of the scroll handle, a latest clicked position on the scroll bar, a number of pages in the file, positions of the upper extremity and the lower extremity of the scroll bar, etc. Although FIG. 1 describes the binary focus navigation unit 102 storing positions of the scroll handle in a scroll handle position database 104, the binary focus navigation unit 102 can also store the scroll handle positions temporarily (e.g., as long as the file 110 is in use, for the duration of a session, etc.) in a data structure (e.g., in volatile memory).

Also, in some implementations, the binary focus navigation unit 102 can also provide functionality to reset the navigation scope of the text file 110. For example, the binary focus navigation unit 102 can present a "reset navigation scope" button or other such graphical object allowing the user to reset navigation scope if the user realizes that he/she is in the wrong portion of the text file. The binary focus navigation unit 102 may also allow a user to reset navigation scope using voice commands. On detecting an indication to reset the current navigation scope, the binary focus navigation unit 102 can present a previous navigation scope of the text file 110. Alternately, the binary focus navigation unit 102 may delete previously stored positions of the scroll handle, present content corresponding to the start of file position, and calculate a new navigation scope based on the user clicking on the scroll bar.

Figure 2:
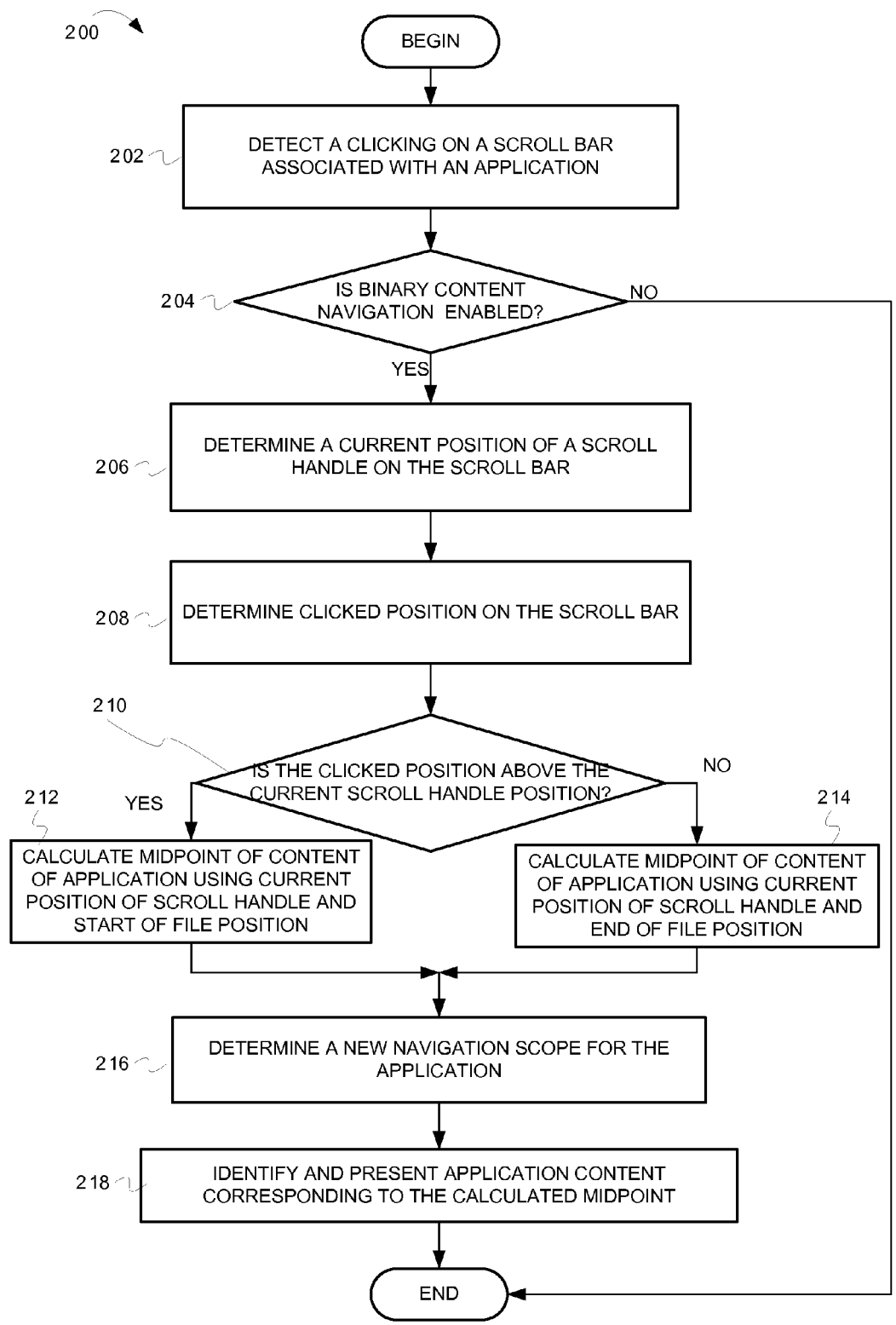
FIG. 2 is a flow diagram illustrating operations for performing binary content navigation in an application.

FIG. 2 is a flow diagram illustrating operations for performing binary content navigation in an application. Flow 200 begins at block 202.

At block 202, a clicking on a scroll bar associated with the application is detected. In one implementation, on detecting that the application has been launched, a scroll bar, comprising a scroll handle for navigating through the application, may be presented. In some implementations, content corresponding to a start of application position may be presented on launching the application. In another implementation, content corresponding to a midpoint of the application (calculated between the content corresponding to the start of application position and content corresponding to an end of application position) may be presented. In another implementation, a last accessed content of the application may be presented. In some implementations, a user may be prompted for login credentials (e.g., a username, password, etc.) before user access to the application is granted and the application is launched. The user credentials may be used to retrieve previously stored user configurations associated with the application. The flow continues at block 204.

At block 204, it is determined whether binary content navigation is enabled for the application. As described earlier, binary content navigation allows for scrolling through content in the application in accordance with binary search techniques. In some implementations, the click indication detected at block 202 may be interpreted differently depending on whether binary content navigation is enabled. For example, if binary content navigation is disabled, a click on the scroll bar may result in presentation of a subsequent page in the application, content in the application corresponding to the clicked position, etc. If it is determined that binary content navigation is enabled, the flow continues at bock 206. Otherwise, the flow ends.

At block 206, a current position of the scroll handle on the scroll bar is determined. The scroll handle may be use to navigate through the application. The current position of the scroll handle may be calculated as a distance from the scroll handle's start of application position or the scroll handle's end of application position on the scroll bar or as a distance from a fixed reference point (e.g., a corner of the file, edge of the display device, etc). In some implementations, the current position of the scroll handle (i.e., current navigation focus within the application) may be determined by identifying a page number associated with the content currently being presented on a display device. The flow continues at block 208.

At block 208, a position associated with the detected clicking ("clicked position") on the scroll bar is determined. The clicked position may be determined by calculating a distance between the clicked position and the fixed reference point used to determine the current position of the scroll handle. The flow continues at block 210.

At block 210, it is determined whether the clicked position is above the current position of the scroll handle. The clicked position may be compared with the current position of the scroll handle and the scroll handle positions corresponding to the start of application position and/or the end of application position on the scroll bar, to determine whether the clicked position is above or below the scroll handle. If it is determined that that the clicked position is above the current position of the scroll handle, the flow continues at block 212. Otherwise, the flow continues at block 214.

At block 212, a midpoint of the content of the application is calculated between the current position of the scroll handle and the scroll handle's start of application position. The calculated midpoint of the content of the application is designated as the current scroll handle position. The current scroll handle position may be stored in a scroll handle position database. The previous scroll handle positions may also be stored as part of the scroll handle position database. Alternately, the scroll handle positions may also be temporarily stored (e.g., in a temporary data structure) until the application is closed. In some implementations, the previous position of the scroll handle may be deleted to store the current position of the scroll handle. The flow continues at block 216.

At block 216, a new navigation scope for the application is determined. The new navigation scope indicates a section of the application through which the user may navigate. The new navigation scope may be determined based on whether the clicked position is above or below the previous position of the scroll handle. For example, if it is determined that clicked position is above the current position of the scroll handle, the upper half of the application may be designated as the navigation scope of the application, and content corresponding to the midpoint of the upper half of the application may be presented. Likewise, if it is determined that clicked position is below the current position of the scroll handle, the lower half of the application may be designated as the navigation scope of the application, and content corresponding to the midpoint of the lower half of the application may be presented. The flow continues at block 218.

At block 218, content in the application corresponding to the midpoint (determined at block 212 or at block 214) is determined. For example, a page number corresponding to the calculated midpoint may first be determined. The content of the application corresponding to the page number of the calculated midpoint (i.e., the current position of the scroll handle) is then presented on the display device. In some implementations, the scroll bar may be adjusted to reflect the new navigation scope of the application (determined at block 216). For example, the scroll bar may be resized to allow navigation through the new navigation scope of the application. In another implementation, a secondary scroll bar, for navigating through the new navigation scope of the application, may be presented. In some implementations, the user may also have an option of resetting the navigation scope of the application, disabling binary content navigation, etc. From block 218, the flow ends.

At block 214, a midpoint of the content of the application is calculated between the current position of the scroll handle and the scroll handle's end of application position is calculated. The flow continues at block 216 where the new navigation scope of the application is identified and the content associated with the new navigation scope of the application is determined and presented.

Figure 3:
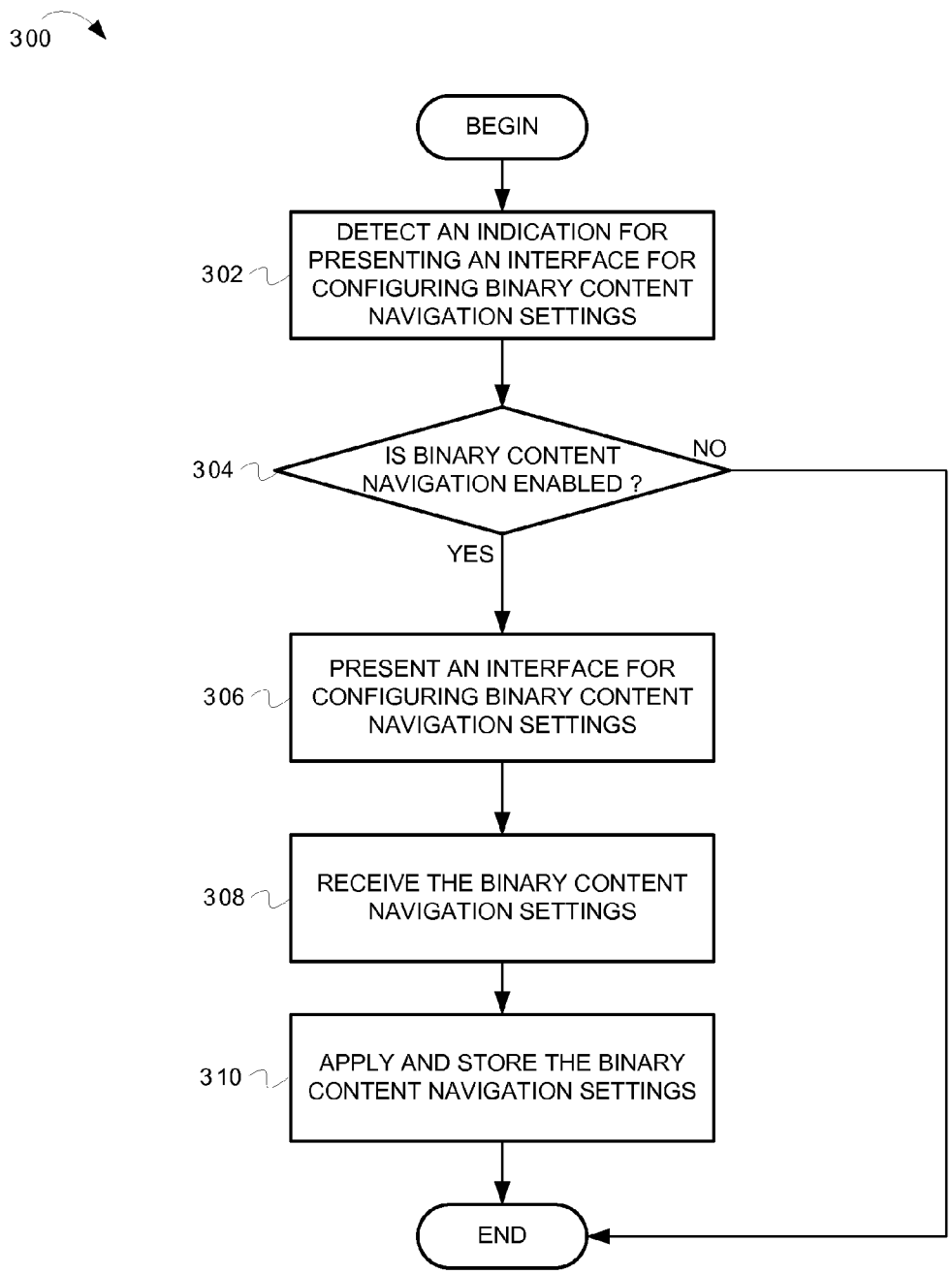
FIG. 3 is a flow diagram illustrating configuring user preferences for binary content navigation.

FIG. 3 is a flow diagram illustrating configuring of user preferences for binary content navigation. Flow 300 begins at block 302.

At block 302, an indication for presentation of an interface for configuring binary content navigation settings is detected. For example, the interface may be presented in response to detecting a right click on a scroll bar associated with an application. As another example, the interface may be presented in response to detecting a click on a button or other GUI object within the application. In some implementations, the interface for configuring binary content navigation settings may be presented in response to detecting an audio input (e.g., the user saying "configure settings" or other predetermined audio command). The flow continues at block 304.

At block 304, it is determined whether binary content navigation is enabled. As described earlier, the indication detected at block 302 may be interpreted differently depending on whether binary content navigation is enabled. For example, if binary content navigation is disabled, a right click on the scroll bar may present options for moving to a next/previous page, line, jumping to a specified page number, etc. Alternately, if binary content navigation is enabled, a right click on the scroll bar may present an interface for configuring the binary content navigation settings. In some implementations, options for configuring binary content navigation operations may not be presented until the user enables binary content navigation. For example, a "configure binary content navigation settings" button may be enabled only after the user enables binary content navigation in the application. If it is determined that binary content navigation is enabled, the flow continues at block 306. Otherwise, the flow ends.

At block 306, the interface for configuring binary content navigation settings is presented. The interface may present users with various options to configure the binary content navigation operations. Configuration options may be presented as drop down menus, radio buttons, checkboxes, or other GUI objects. Users may also have an option of inserting code to configure the binary content navigation settings. The flow continues at block 308.

At block 308, binary content navigation settings are received. The user may employ any suitable input device to configure the binary content navigation settings. For example, the binary focus navigation unit 102 can present an interface allowing the user to indicate whether binary content navigation should be automatically enabled when the application is launched, whether binary content navigation should be enabled in response to a user input (e.g., a user clicking on a GUI object or a voice command), etc. As another example, the user may indicate that binary content navigation should automatically be enabled for files that are larger than a predetermined file size. As another example, the user may indicate that binary content navigation should be disabled on detecting a click outside the scroll bar (or other designated scrolling area).

The user may also indicate whether a first page of the application, content corresponding to the midpoint of the application, or a last accessed page of the application should be presented when the application is launched. The user may also indicate whether binary content navigation should be implemented using one or more input devices (e.g., a mouse, keyboard, audio input, tactile input, etc). For example, the user may indicate that binary content navigation should be performed on detecting a "page up" or a "page down" keyboard input, while page-by-page scrolling should be performed on detecting an up/down arrow key input.

The user may also configure different binary content navigation settings for different file types and/or different files. The user may also indicate that binary content navigation should be disabled in files with a specified file extension. For example, the user may indicate that binary content navigation should be permanently disabled in audio and video files. As another example, the user may indicate that binary content navigation should be automatically enabled when a file with a ".txt" or a ".doc" extension is launched. In one implementation, the user may configure a different set of user preferences for different files. For example, the user may indicate that binary content navigation should be automatically enabled in a file with file name "File_A.doc", while binary content navigation should be permanently disabled in another file with file name "File_Z.doc".

The user can also configure binary content navigation options to indicate navigation scope of the application. For example, the user may indicate that a separate scroll bar, for the current navigation scope of the application, should be presented every time the user clicks on the scroll bar to refine the navigation scope of the application. As another example, the user can indicate that the scroll bar should be adjusted to reflect the current navigation scope of the application. Settings may also be configured so that if the user clicks on a position below the current position of the scroll handle, the lower half of the application becomes the new navigation scope of the application and the content corresponding to the midpoint position of the new navigation scope of the application is presented on the display device. Various options may also be configured to reset the navigation scope of the application. In one implementation, clicking on a designated graphical object (or using a specified voice command) may reset the navigation scope of the application. In another implementation, clicking outside a designated scrolling area may reset the navigation scope of the application. In another implementation, clicking outside a designated scrolling area may disable binary content navigation in the application.

Binary content navigation settings may also be configured to present visual markers on the scroll bar. The visual markers can depict midpoints above and below the current position of the scroll handle. Users may have an option of clicking on one of the visual markers to scroll to the specified midpoint. After the binary content navigation settings are received, the flow continues at block 310.

At block 310, the binary content navigation settings are applied to the application for which the settings were configured. Additionally, the binary content navigation settings may also be stored in a user preference database. When the user launches an application, the user may be prompted to enter login information (e.g., a user name, fingerprint scan or other biometric information, a password, answers to a series of questions, etc). The binary content navigation settings configured by the user may be retrieved and the operations for binary content navigation may be tailored in accordance with the retrieved settings. From block 310, the flow ends.

It should be noted that the operations described in the flow diagrams (FIGS. 2-3) are examples meant to aid in understanding embodiments, and should not be used to limit embodiments or limit scope of the claims. Embodiments may perform additional operations, fewer operations, operations in a different order, operations in parallel, and some operations differently. For example, in FIG. 3 if it is determined that binary content navigation is not enabled (the "no" path from block 304), the user may be given an option (e.g., via a pop-up menu) for enabling binary content navigation in the application. Also, in some implementations, instead of comparing the clicked position with the scroll handle position (see block 210 in FIG. 2), it may be determined whether the clicked position is closer to the lower extremity or the upper extremity of the scroll bar. The midpoint may be calculated between the current position of the scroll handle and the extremity to which the clicked position is the closest. The searchable portion of the application may be configurable. For example, the user may configure settings to calculate the midpoint between the current position of the scroll handle and the extremity that is farthest from the clicked position.

Also, although FIG. 2 depicts binary content navigation in response to a user clicking on the scroll bar, any suitable form of binary navigation input may be detected. For example, voice commands for navigating through the content (the user saying "scroll up") may be detected. As another example, keyboard key presses for navigating through the content may also be detected. For instance, in response to detecting a "page up" key press, it may be determined that the user wants to scroll through content above the currently presented content. For the examples described above, specific commands or key presses may be used to indicate whether the binary navigation input navigates above or below the currently presented content. In other words, on detecting a "scroll up" voice command, it can be determined that the user wants to scroll above the currently presented content.

Users may also have an option of speeding up the binary content navigation process by initiating the operations for binary content navigation from any point in the application. For example, the user may scroll (e.g., page-by-page scrolling, dragging the scroll handle to a point on the scroll bar, etc.) to a position in the application and enable binary content navigation starting from the position.

In some implementations, users may be required to click on an up/down directional arrow on the scroll handle to indicate a direction of binary content navigation. In some implementations, the users may not be required to click on/within the scroll bar to indicate the direction of navigation through the application. Instead, the directional arrows may be presented in a separate pop-up window to ensure ease of navigation. This can enable users to navigate through the document using binary content navigation.

It should also be noted that although the operations refer to calculating a midpoint between reference points in the content, an intermediate position between the references may be calculated. While, in some implementations, the intermediate position can be the true midpoint between the reference points, in other implementations, the intermediate position may be an approximate midpoint between the reference points in the content. The approximate midpoint may be a position approximately halfway between the reference points and may be the true midpoint compensated by an offset (e.g., the true midpoint plus/minus the offset).

Lastly, although examples refer to binary content navigation being performed on a text file, operations for binary content navigation may be performed on any suitable type of file containing any one or a combination of text, images, audio, video, graphs, etc. For example, binary content navigation may be performed on an audio file, a video file, a spreadsheet, etc. For instance, binary content navigation may be performed on multimedia content in a large video file. On detecting an input to scroll through the file using binary content navigation, content corresponding to the midpoint of the video file may be presented. The content may be presented as a single still image, a series of still images, a five-second (or other configurable time interval) clip of the multimedia content starting from the midpoint position, etc. As described earlier, the user can provide inputs to jump through the multimedia content in the video file until the user finds the required content. Binary content navigation is also not limited to files with large file size. In some implementations, users may have an option of not configuring settings for binary content navigation. A set of default settings (e.g., settings configured by an administrator, manufacturer settings, etc.) may be employed if the user chooses not to configure the settings or if the user does not log into a machine.

Figure 4:
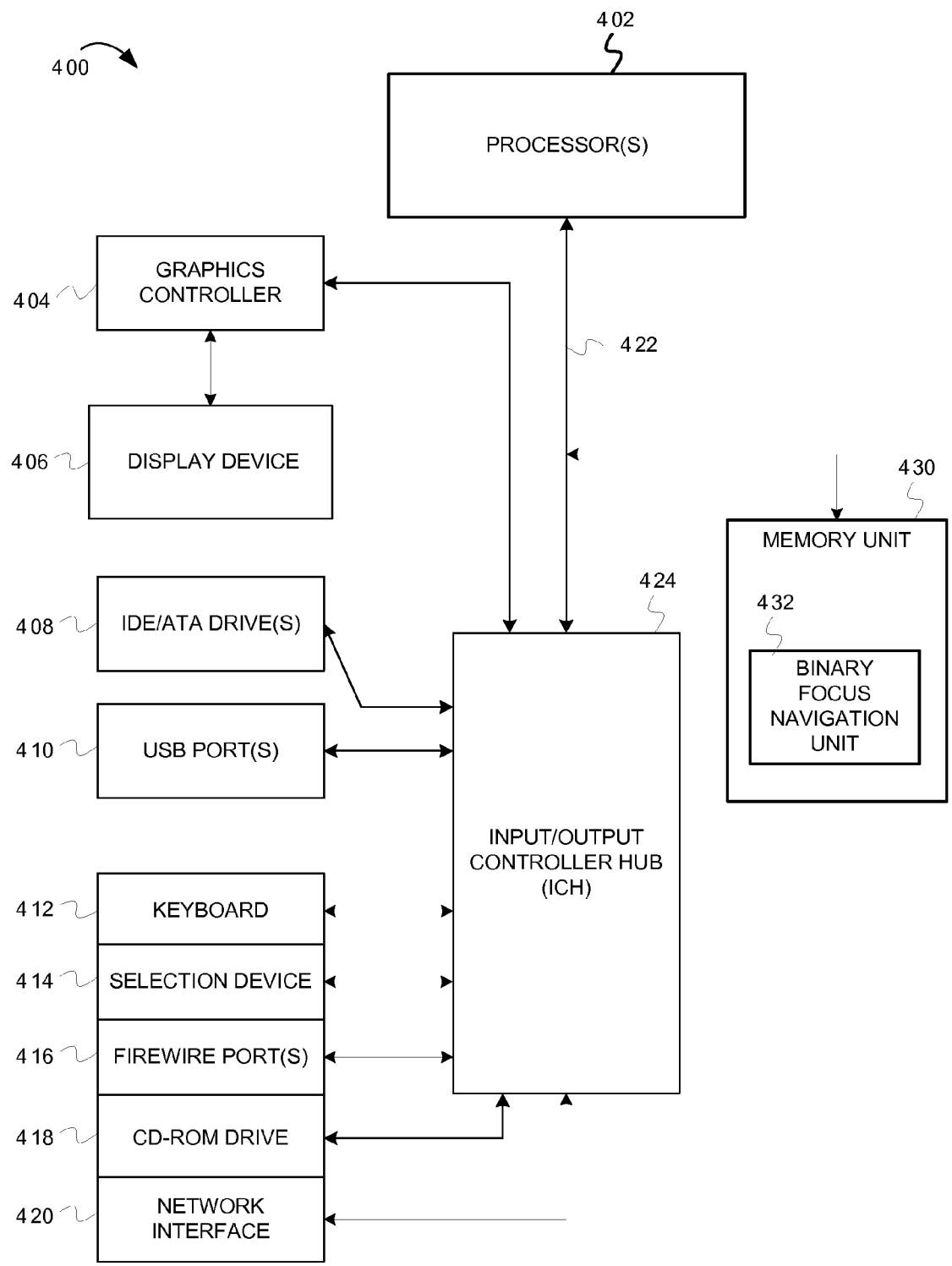
FIG. 4 is an example computer system configured for performing scrolling operations in accordance with a binary search algorithm.

FIG. 4 is an example computer system 400 configured for performing scrolling operations in accordance with binary search techniques. The computer system 400 includes a processor 402. The processor 402 is connected to an input/output controller hub 424 (ICH), also known as a south bridge, via a bus 422 (e.g., PCI, ISA, PCI-Express, HyperTransport, etc). A memory unit 430 interfaces with the processor 402 and the ICH 424. The main memory unit 430 can include any suitable random access memory (RAM), such as static RAM, dynamic RAM, synchronous dynamic RAM, extended data output RAM, etc The memory unit 430 comprises a binary focus navigation unit 432. The binary focus navigation unit 432 embodies functionality described in accordance with FIGS. 1-3. The binary focus navigation unit 432 uses its knowledge of the current focus within a file, determines whether the user wants to scroll up or scroll down, and accordingly performs scroll jumps using binary search techniques. The binary focus navigation unit 432 also adjusts the navigation scope for the application every time a user clicks on a designated scroll area (e.g., the scroll bar, directional arrows, etc.) to refine or expand the navigation scope of the application.

The ICH 424 connects and controls peripheral devices. In FIG. 4, the ICH 424 is connected to IDE/ATA drives 408 and to universal serial bus (USB) ports 410. The ICH 424 may also be connected to a keyboard 412, a selection device 414, firewire ports 416, CD-ROM drive 418, and a network interface 420. The ICH 424 can also be connected to a graphics controller 404. The graphics controller is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may be integrated or subdivided.

Embodiments may take the form of a hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for binary content navigation as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a first binary navigation input for navigating content wherein an application displays a current portion of the content with a user interface;
   determining whether the first binary navigation input navigates between the current portion of the content and a beginning navigation portion of the content or an ending navigation portion of the content, wherein at least one of the beginning navigation portion of the content is different than the beginning of the content and the ending navigation portion of the content is different than the end of the content;
   determining an intermediate position, wherein the intermediate position is a midpoint between the current portion of the content and the beginning navigation portion of the content if the first binary content navigation input navigates between the current-portion of the content and the beginning navigation portion of the content, wherein the intermediate position is a midpoint between the current portion of the content and the ending navigation portion of the content if the first binary content navigation input navigates between the current portion of the content and the ending navigation portion of the content;
   storing an indication of the current portion as a first new ending navigation portion if the first binary content navigation input navigates between the current portion of the content and the beginning navigation portion of the content;
   storing an indication of the current portion as a first new beginning navigation portion if the binary content navigation input navigates between the current portion of the content and the ending navigation portion of the content;
   displaying a first new current portion of the content that corresponds to the intermediate position in response to said determining the intermediate position;
   receiving a second binary navigation input for navigating content wherein the application displays the first new current portion of the content;
   determining whether the second binary navigation input navigates between the first new current portion of the content and either the new beginning navigation portion of the content or the new ending navigation portion of the content;
   determining a new intermediate position, wherein the new intermediate position is a midpoint between the first new current portion of the content and the first new beginning navigation portion of the content if the second binary content navigation input navigates between the first new current portion of the content and the first new beginning navigation portion of the content, wherein the new intermediate position is a midpoint between the first new current portion of the content and the first new ending navigation portion of the content if the second binary content navigation input navigates between the first new current portion of the content and the first new ending navigation portion of the content;
   storing an indication of the first new current portion as a second new ending navigation portion if the second binary content navigation input navigates between the first new current portion of the content and the first new beginning navigation portion of the content;
   storing an indication of the first new current portion as a second new beginning navigation portion of the second binary content navigation input navigates between the first new current portion of the content and the first new ending navigation portion of the content; and
   displaying a second new current portion of the content that corresponds to the new intermediate position in response to said determining the new intermediate position.

2. The method of claim 1, wherein the receiving the first binary navigation input for navigating the content comprises one of determining a click on a scroll bar associated with the application, detecting a voice command, and detecting a combination of one or more key presses.

3. The method of claim 2, wherein the determining whether the first binary navigation input navigates between the current portion of the content and the beginning navigation portion of the content or the ending navigation portion of the content further comprises comparing a position of the click on the scroll bar associated with the application with an initial position of a scroll handle that corresponds to the current portion of the content.

4. The method of claim 1, further comprising:
   detecting a menu click on a scroll bar associated with the application; and
   presenting options for configuring one or more binary content navigation operations on the user interface.

5. The method of claim 4, wherein the binary content navigation operations comprise one or more of automatically enabling binary content navigation on launching the application, enabling binary content navigation in response to a user input, presenting a first visual marker indicating the intermediate position between the current portion of the content and the beginning navigation portion of the content and a second visual marker indicating the intermediate position between the current portion of the content and an ending navigation portion of the content, and configuring one or more keys on a keyboard to implement binary content navigation.

6. The method of claim 1, further comprising:
   determining a navigation scope for the application, wherein the navigation scope permits one of navigation between the portion of the content that corresponds to the intermediate position and the beginning navigation portion if the binary navigation input navigates between the current portion of the content and the beginning navigation portion of the content and navigation between the portion of the content that corresponds to the intermediate position and the ending navigation portion if the binary navigation input navigates between the current portion of the content and the ending navigation portion of the content.

7. The method of claim 6, further comprising one of:
resizing a scroll bar previously used for navigating through a previous navigation scope for the application; and
presenting the resized scroll bar for navigating through the navigation scope of the application, and
presenting a new scroll bar for navigating through the navigation scope for the application.

8. The method of claim 1, wherein the content in the application comprises one or more of text, graphs, images, audio, and video.

9. The method of claim 1, wherein the midpoint comprises one of a true midpoint and an approximate midpoint, wherein the approximate midpoint is the true midpoint shifted by an offset.

10. A computer program product for binary content navigation, the computer program product comprising:
a non-transitory computer usable medium having computer usable program code embodied therewith, the computer usable program code configured to:
receive a first binary navigation input for navigating content wherein an application displays a current portion of the content with a user interface;
determine whether the first binary navigation input navigates between the current portion of the content and a beginning navigation portion of the content or an ending navigation portion of the content, wherein at least one of the beginning navigation portion of the content is different than the beginning of the content and the ending navigation portion of the content is different than the end of the content;
determine an intermediate position, wherein the intermediate position is a midpoint between the current-portion of the content and the beginning navigation portion of the content if the first binary content navigation input navigates between the current portion of the content and the beginning navigation portion of the content, wherein the intermediate position is a midpoint between the current portion of the content and the ending navigation portion of the content if the first binary content navigation input navigates between the current portion of the content and the ending navigation portion of the content;
store an indication of the current portion as a new ending navigation portion if the first binary content navigation input navigates between the current portion of the content and the beginning navigation portion of the content;
store an indication of the current portion as a new beginning navigation portion if the first binary content navigation input navigates between the current portion of the content and the ending navigation portion of the content;
display a new current portion of the content that corresponds to the intermediate position in response to the computer usable program code determining the intermediate position;
receive a second binary navigation input for navigating content wherein the application displays the first new current portion of the content;
determine whether the second binary navigation input navigates between the first new current portion of the content and either the new beginning navigation portion of the content or the new ending navigation portion of the content;
determine a new intermediate position, wherein the new intermediate position is a midpoint between the first new current portion of the content and the first new beginning navigation portion of the content if the second binary content navigation input navigates between the first new current portion of the content and the first new beginning navigation portion of the content, wherein the new intermediate position is a midpoint between the first new current portion of the content and the first new ending navigation portion of the content if the second binary content navigation input navigates between the first new current portion of the content and the first new ending navigation portion of the content;
store an indication of the first new current portion as a second new ending navigation portion if the second binary content navigation input navigates between the first new current portion of the content and the first new beginning navigation portion of the content;
store an indication of the first new current portion as a second new beginning navigation portion if the second binary content navigation input navigates between the first new current portion of the content and the first new ending navigation portion of the content; and
display a second new current portion of the content that corresponds to the new intermediate position in response to said determining the new intermediate position.

11. The computer program product of claim 10, wherein the computer usable program code configured to receive the first binary navigation input for navigating the content and configured to receive the second binary navigation input for navigating the content comprises one of the computer usable program code configured to determine a click on a scroll bar associated with the application, computer usable program code configured to detect a voice command, and computer usable program code configured to detect a combination of one or more key presses.

12. The computer program product of claim 11, wherein the computer usable program code configured to determine whether the first binary navigation input navigates between the current portion of the content and the beginning navigation portion of the content or the ending navigation portion of the content and configured to determine whether the second binary navigation input navigates between the new current portion of the content and the new beginning navigation portion of the content or the new ending navigation portion of the content further comprises the computer usable program code configured to compare a position of the click on the scroll bar associated with the application with an initial position of a scroll handle that corresponds to the current portion of the content.

13. The computer program product of claim 10, wherein the computer usable program code is further configured to:
detect a menu click on a scroll bar associated with the application; and
present options for configuring one or more binary content navigation operations on the user interface.

14. The computer program product of claim 13, wherein the binary content navigation operations comprise one or more of automatically enabling binary content navigation on launching the application, enabling binary content navigation in response to a user input, presenting a first visual marker indicating the intermediate position between the current portion of the content and the beginning navigation portion of the content and a second visual marker indicating the intermediate position between the current portion of the content and an ending navigation portion of the content, and configuring one or more keys on a keyboard to implement binary content navigation.

15. The computer program product of claim 10, wherein the computer usable program code is further configured to:
   determine a navigation scope for the application, wherein the navigation scope permits one of navigation between the portion of the content that corresponds to the intermediate position and the beginning navigation portion if the binary navigation input navigates between the current portion of the content and the beginning navigation portion of the content and navigation between the portion of the content that corresponds to the intermediate position and the ending navigation portion if the binary navigation input navigates between the current portion of the content and the ending navigation portion of the content.

16. The computer program product of claim 15, wherein the computer usable program code is further configured to one of:
   resize a scroll bar previously used for navigating through a previous navigation scope for the application; and presenting the resized scroll bar for navigating through the navigation scope of the application, and
   present a new scroll bar for navigating through the navigation scope for the application.

17. An apparatus comprising:
   a processor;
   a network interface coupled with the processor;
   a binary focus navigation unit configured to,
      receive a first binary navigation input for navigating content wherein an application displays a current portion of the content with a user interface;
      determine whether the first binary navigation input navigates between the current portion of the content and a beginning navigation portion of the content or an ending navigation portion of the content, wherein at least one of the beginning navigation portion of the content is different than the beginning of the content and the ending navigation portion of the content is different than the end of the content;
      determine an intermediate position, wherein the intermediate position is a midpoint between the current portion of the content and the beginning navigation portion of the content if the first binary content navigation input navigates between the current portion of the content and the beginning navigation portion of the content, wherein the intermediate position is a midpoint between the current portion of the content and the ending navigation portion of the content if the first binary content navigation input navigates between the current portion of the content and the ending navigation portion of the content;
      store an indication of the current portion as a new ending navigation portion if the first binary content navigation input navigates between the current portion of the content and the beginning navigation portion of the content;
      store an indication of the current portion as a new beginning navigation portion if the first binary content navigation input navigates between the current portion of the content and the ending navigation portion of the content;
      display a new current portion of the content that corresponds to the intermediate position in response to the binary focus navigation unit determining the intermediate position;
      receive a second binary navigation input for navigating content wherein the application displays the first new current portion of the content;
      determine whether the second binary navigation input navigates between the first new current portion of the content and either the new beginning navigation portion of the content or the new ending navigation portion of the content;
      determine a new intermediate position, wherein the new intermediate position is a midpoint between the first new current portion of the content and the first new beginning navigation portion of the content if the second binary content navigation input navigates between the first new current portion of the content and the first new beginning navigation portion of the content, wherein the new intermediate position is a midpoint between the first new current portion of the content and the first new ending navigation portion of the content if the second binary content navigation input navigates between the first new current portion of the content and the first new ending navigation portion of the content;
      store an indication of the first new current portion as a second new ending navigation portion if the second binary content navigation input navigates between the first new current portion of the content and the first new beginning navigation portion of the content;
      store an indication of the first new current portion as a second new beginning navigation portion if the second binary content navigation input navigates between the first new current portion of the content and the first new ending navigation portion of the content; and
      display a second new current portion of the content that corresponds to the new intermediate position in response to said determining the new intermediate position.

18. The apparatus of claim 17, wherein the binary focus navigation unit operable to receive the first binary navigation input for navigating the content further comprises one of the binary focus navigation unit operable to determine a click on a scroll bar associated with the application, the binary focus navigation unit operable to detect a voice command, and the binary focus navigation unit operable to detect a combination of one or more key presses.

19. The apparatus of claim 18, wherein the binary focus navigation unit operable to determine whether the first binary navigation input navigates between the current portion of the content and the beginning navigation portion of the content or the ending navigation portion of the content further comprises the binary focus navigation unit operable to compare a position of the click on the scroll bar associated with the application with an initial position of a scroll handle that corresponds to the current portion of the content.

20. The apparatus of claim 17, wherein the binary focus navigation unit comprises one or more machine-readable media.

* * * * *